United States Patent [19]

Lehureau

[11] Patent Number: 5,157,641
[45] Date of Patent: Oct. 20, 1992

[54] APPARATUS FOR GENERATING A MAGNETIC BIASING FIELD FOR RECORDING IN A MAGNETO-OPTICAL RECORDING MEDIUM

[75] Inventor: Jean-Claude Lehureau, Sainte Genevieve des Bois, France

[73] Assignee: Thomson-CSF, Puteaux, France

[21] Appl. No.: 646,622

[22] PCT Filed: Jun. 1, 1990

[86] PCT No.: PCT/FR90/00386
§ 371 Date: Jan. 31, 1991
§ 102(e) Date: Jan. 31, 1991

[87] PCT Pub. No.: WO90/15409
PCT Pub. Date: Dec. 13, 1990

[30] Foreign Application Priority Data

Jun. 2, 1989 [FR] France ............... 89 07307

[51] Int. Cl.$^5$ ............... G11B 13/04; G11B 11/10; G11B 11/12
[52] U.S. Cl. ............... 369/13; 360/114; 360/59; 360/66
[58] Field of Search ............... 369/13; 360/59, 66, 360/114, 60; 361/140, 152

[56] References Cited

U.S. PATENT DOCUMENTS

| | | | |
|---|---|---|---|
| 3,484,673 | 12/1969 | Strobel | 320/1 |
| 3,737,735 | 6/1973 | Benassi | 321/20 |
| 4,872,078 | 10/1989 | Gerber et al. | 360/114 |
| 4,907,211 | 3/1990 | Horimai et al. | 369/13 |

FOREIGN PATENT DOCUMENTS

| | | | |
|---|---|---|---|
| 0251561 | 1/1988 | European Pat. Off. | |
| 0312143 | 4/1989 | European Pat. Off. | 369/13 |
| 59-140605 | 8/1984 | Japan | 360/66 |
| 63-34756 | 2/1988 | Japan | 360/114 |
| 63-55746 | 3/1988 | Japan | 360/114 |

OTHER PUBLICATIONS

Froess, "Current Reversal in Inductive Loads", IBM Tech. Disclosure Bulletin, vol. 11, No. 10, Mar. 1969, p. 1365.
I.E.E.E. Transactions on Magnetics, vol. 24, No. 1, Jan. 1988, New York, U.S.A., pp. 666–669; D. Rugar: "Magnetooptic Direct Overwrite Using a Resonant Bias Coil".

*Primary Examiner*—Hoa Nguyen
*Attorney, Agent, or Firm*—Oblon, Spivak, McClelland, Maier & Neustadt

[57] ABSTRACT

An apparatus for generating a magnetic biasing field for recording in a magneto-optical medium, including a coil mounted on a core and connected in parallel with a capacitor and a first switch, and a control circuit for generating a first pulse for opening and closing of the first switch upon each transition of an information signal to be recorded, thereby to produce magnetic flux inversions in the core. A second coil is mounted on the same core as the first coil. Second and third switches are connected in series between positive and negative voltages, and a series connection point between the second and third switches is connected to the second coil, the other end of which is connected to ground. Second and third pulses of fixed duration are applied to the second and third switches based on the trailing and leading edges of the information signal to be recorded, respectively. Monostables are used to generate the first, second and third pulses. The control circuit includes the monostables.

7 Claims, 2 Drawing Sheets

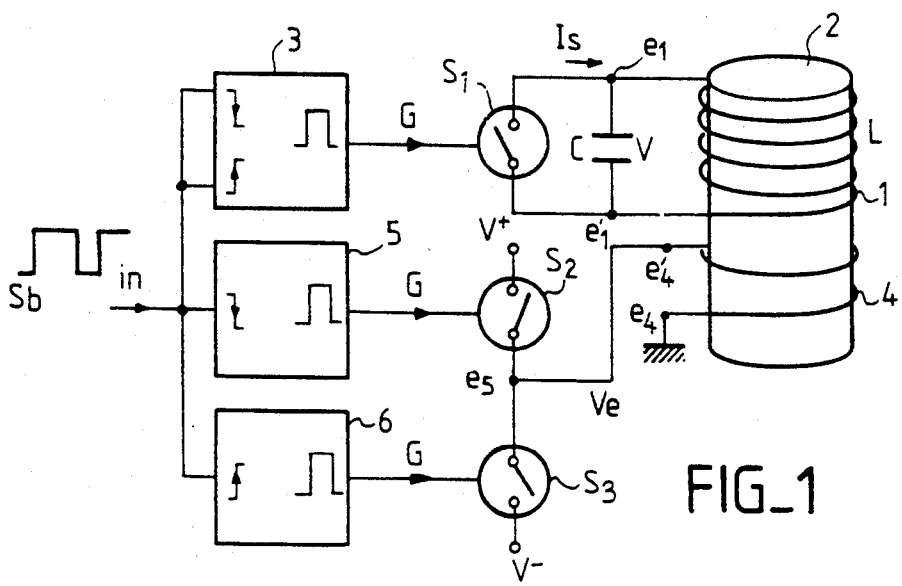
FIG_1
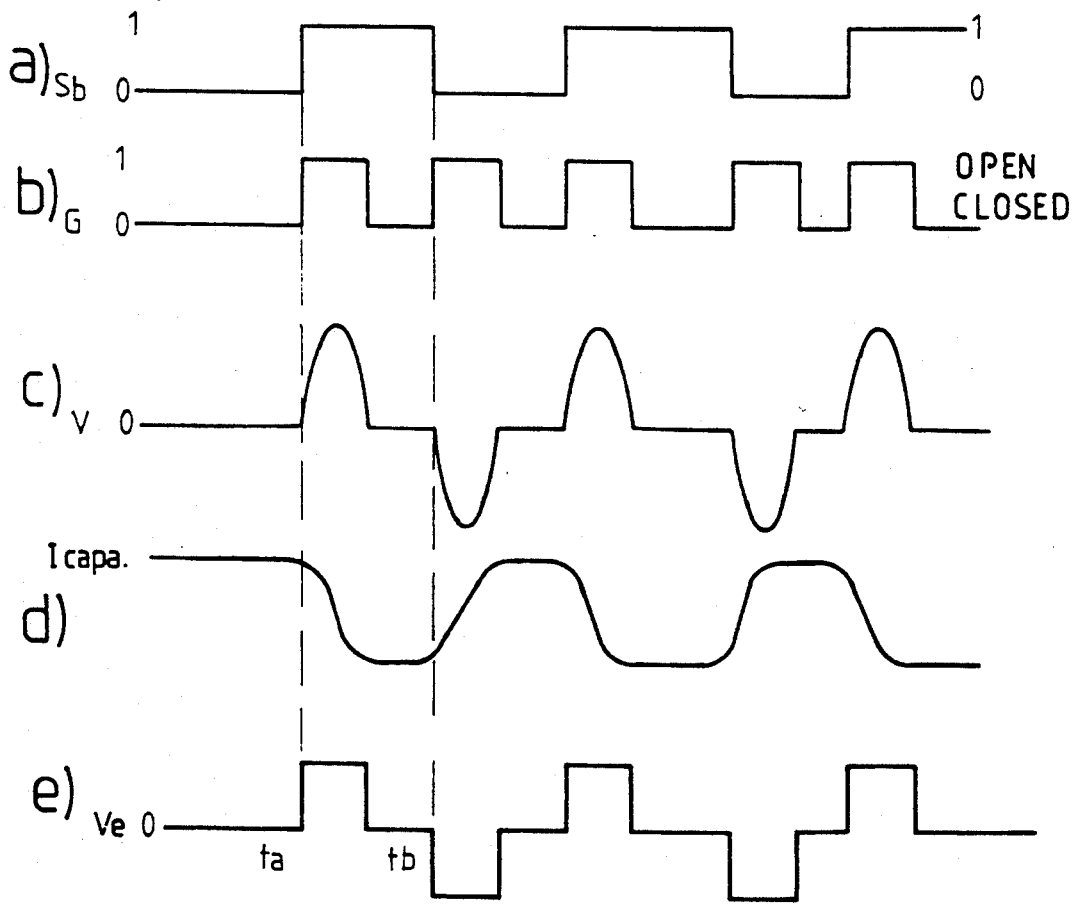
FIG_2

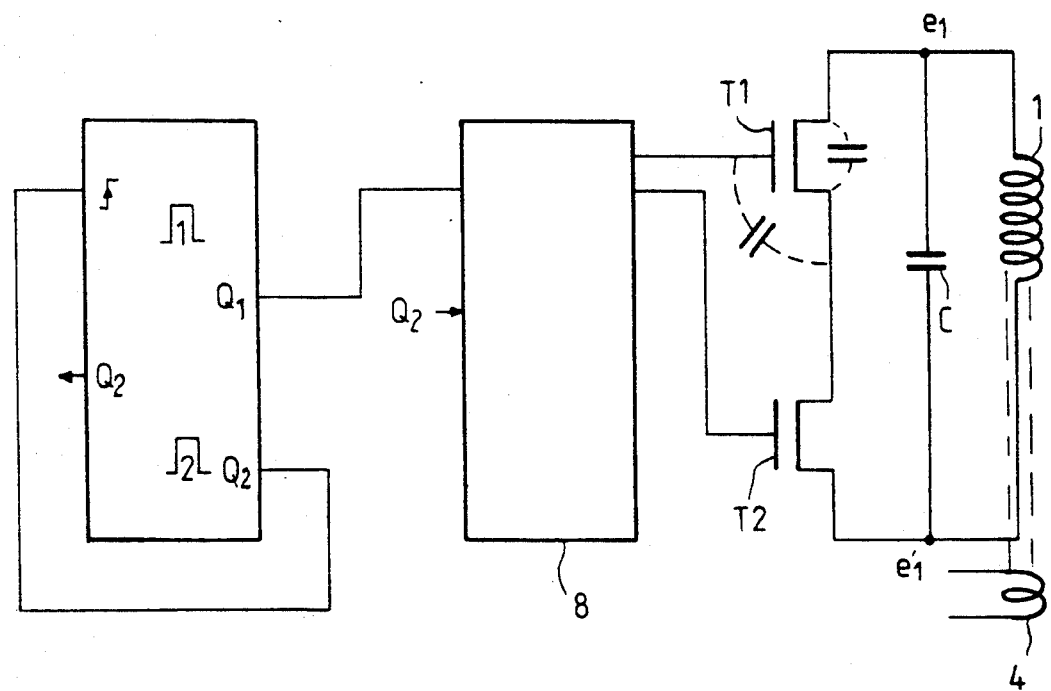
FIG_3

APPARATUS FOR GENERATING A MAGNETIC BIASING FIELD FOR RECORDING IN A MAGNETO-OPTICAL RECORDING MEDIUM

BACKGROUND OF THE INVENTION

The present invention relates to an apparatus for generating a magnetic biasing field for recording in a magneto-optical memory. By magneto-optical memory is meant any medium for magneto-optical recording presenting magnetic anisotropy perpendicular to its surface.

A medium of magneto-optical recording, or a magneto-optical memory, comprises essentially a magnetic layer stable at ambient temperature. To record in this type of memory, the magnetic layer is first magnetized perpendicular to its surface, e g. upwards. Information is recorded by locally inverting the direction of magnetization by heating the zone to be recorded to a temperature above Curie point and simultaneously applying an external magnetic field. When it cools to the ambient temperature, the new direction of magnetization is "frozen". The zone to be recorded is generally heated using a laser beam, while the magnetic field is obtained using a magnetic field generator such as a coil. Therefore, to record information, either the laser beam or the magnetic field generator can be modulated.

The solution consisting in modulating the magnetic field generator has a number of advantages. In fact, there is perfect symmetry between the two directions of magnetization, upwards and downwards, thus there are no second-order harmonics in the re-read signal. It is therefore not necessary to use an erasure cycle before writing. However, modulation of the magnetic field generator requires manipulation of great energy at high frequency, which causes large-scale losses by dissipation.

As a result, the present invention aims to provide a new apparatus for generating a magnetic biasing field for recording in a magneto-optical memory which substantially reduces dissipation losses.

The present invention also aims to provide a new apparatus for generating a magnetic biasing field for recording in a magneto-optical memory of particularly simple construction and usable whatever the modulation code used for the information signals to be recorded.

SUMMARY OF THE INVENTION

Thus, the object of the present invention is an apparatus for generating a magnetic biasing field for recording in a magneto-optical memory, characterized by the fact that it comprises, mounted in parallel, a first coil generating a magnetic field of polarity defined by the information signal, a capacitor and a switching circuit, the opening and closing of the switching circuit being controlled by a first pulse of fixed duration, generated at each transition of the information signal to be recorded.

According to a preferred embodiment, to avoid energy losses, the first pulse has a duration $t = \pi \sqrt{LC}$, where L represents the inductance of the coil and C the capacitance value. Thus, the closing pulses of the switching circuit occur when the voltage across the capacitor equals zero, i.e. when the capacitor is completely discharged.

The first pulse is generated by a monostable connected in such a way as to trigger at each transition of the information signal to be recorded.

According to a preferred embodiment, the switching circuit is constituted of at least one MOS power transistor receiving the first fixed-duration pulse on its gate.

However, to prevent the passing diode effect on the drain of the MOS transistor, the switching circuit is preferentially constituted of two MOS transistors mounted head to tail, each receiving on their base the first pulse of fixed duration.

According to another feature of present invention, the apparatus for generating a magnetic biasing field also includes a triggering and sustaining circuit.

According to a preferred embodiment, the triggering and sustaining circuit is formed of a second coil mounted on the same core as the first coil and connected between the earth and the common point between two switches connected to a positive voltage and a negative voltage respectively, the opening and closing of the switches being controlled respectively by a second and a third pulse of fixed duration, the second pulse being generated by the trailing edge of the information signal to be recorded, while the third pulse is generated by the leading edge of the information signal to be recorded.

Preferentially, the second and third pulses of fixed duration have the same duration as the first pulse of fixed duration. Each pulse is generated by a monostable.

BRIEF DESCRIPTION OF THE DRAWINGS

Other features and advantages of present invention will appear on reading the description below of different non-restrictive embodiments with reference to the appended drawings, of which:

FIG. 1 is a connection diagram of a first electro-mechanical mode of embodiment of an apparatus according to the present invention;

FIGS. 2a–2e represent the electric signals at different points in the circuit, and FIG. 3 is a connection diagram of an electronic mode of embodiment of the apparatus of the present invention.

To simplify the description, the same parts have the same references in all the drawings.

The apparatus of present invention is constituted essentially of a first coil 1 mounted on a magnetic core 2 in such a way as to create the external magnetic field enabling recording of a magneto-optical recording medium, which has not been shown in the drawings in order to simplify them. On the two terminals e1 and e'1 of the coil 1 are mounted in parallel a capacitor C and a switching circuit S1 respectively. The opening and closing of the switching circuit S1 are controlled by a pulse G generated by a monostable trigger 3. As represented diagrammatically in FIG. 1, the monostable 3 receives at both its inputs the information signal to be recorded Sb, which is a binary signal with a low or "zero" state and a high or "1" state. The various terminals of the monostable circuit 3 have been connected in the most usual way so that the monostable 3 switches at each transition of the information signal, as shown in FIG. 3.

In addition, to enable triggering and sustaining of the circuit generating the magnetic field formed by the coil 1, the apparatus of present invention also has a coil 4 wound on the core 2 which, in fact, constitutes the primary of the circuit formed of coils 1 and 4. One of the terminals e4 of the coil 4 is connected to the earth, while the other terminal e'4 is connected to the common point e5 between two switches S2, S3 mounted in series between a positive voltage +V and a negative voltage −V. The opening and closing of the switches S2 and S3 are controlled by second and third pulses of fixed duration. In fact, the second and third pulses have durations identical to that of the pulse G and will be referenced in the same way on FIG. 1. The second pulse comes from a monostable 5 which receives as input the information signal Sb and whose terminals are connected in such a way as to be activated by the trailing edge of the information signal. The switch S3 receives a pulse of determined duration from a monostable 6. This monostable 6 receives as input the information signal Sb and its terminals are connected in such a way as to be activated by the leading edge of the signal.

The functioning of the circuit described above will now be explained with reference to FIG. 2. As represented in FIG. 2 (a), the information signal Sb is a binary signal constituted of a series of information at a low level "0" and a high level "1". This information signal Sb can have the appearance of the signal shown in FIG. 2 (a), for example. In general, the information to be recorded is coded using asynchronous binary codes which have the advantage of being compact.

The signal Sb is applied notably to the monostable 3. When the signal Sb changes from 0 to 1 as shown at time ta, the monostable is triggered and emits a calibrated pulse G, i.e. a pulse of fixed duration T. Throughout the duration of this pulse, the switch S1 is open. The current IS which was passing through the coil 1 and the switching circuit S1 is then reflected in the capacitor C. The voltage V at the terminals of the capacitor C begins to oscillate, the circuit formed of the capacitor C and the coil 1 form an oscillating circuit. When the pulse G is finished, the switching circuit S1 is closed again and the voltage at the capacitor terminals becomes equal to zero. To prevent dissipation losses, the duration of the pulse G is chosen in such a way that $T = \pi \sqrt{LC}$, i.e. T corresponds to a half-cycle of the oscillating circuit formed by the capacitor C and the coil 1. Thus, the switching circuit S1 closes at the moment when the voltage V at the capacitor terminals passes to zero, as shown in FIG. 2 (c). Then the current I is maintained in the coil 1. This current is negative as shown in FIG. 2 (d) and the direction of magnetization is reversed. When the information signal Sb undergoes a new transition, passing from a level "1" to a level "0" as shown at time tb in FIG. 2, the monostable 3 generates a new pulse G which reopens the switching circuit S1. The negative current IS which was passing through the coil is again reflected in the capacitor C and a negative voltage V develops in the capacitor C, as shown in FIG. 2 (c). The current in the coil 1 flows in the other direction in such a way as to induce a magnetic field of the opposite direction to that induced during the period ta, tb. In addition, as represented in FIG. 2 (e), at each transition the voltage VE is positive or negative in such a way as to inject, via the coil 4, an additional flux into the circuit of the coil 1 to compensate for the dissipative losses which occur during the transition and during the holding.

As shown in FIG. 3, the switching circuit S1 can be made up of two MOS power transistors T1 and T2 mounted head to tail. Thus, the drain of the transistor T2 is connected to the drain of the transistor T1 and the sources of the transistors T1 and T2 are connected to the terminals e1 and e'1 respectively of the coil 1. In this case, the gates of the transistors T1 and T2 receive a pulse G from a control circuit 8.

This device 8 receives as input the output Q1 from a monostable 3. The monostable 3 receives the information signal Sb at one of its inputs and the output Q2 of the monostable 3 is connected to this input so that the monostable 3 switches over for each transition.

As an example, the coil 1 presents an inductance of 45 $\mu$H, and the capacitor C a capacitance of 2 nF.

What is claimed is:

1. An apparatus for generating a magnetic biasing field for recording in a magneto-optical recording medium, comprising:
    a magnetic field generating means including a coil mounted on a core and connected in parallel with a capacitor and a first switch, for generating said magnetic biasing field as a magnetic flux which is inverted in accordance with opening and closing of said first switch, thereby produces magnetic flux inversions;
    a control circuit for driving said magnetic field generating means in accordance with an information signal to be recorded, including pulse generating means for generating a first pulse of a fixed duration for opening and closing the first switch, wherein said fixed pulse is generated on each transition of the information signal to be recorded; and
    a triggering and sustaining circuit for triggering and sustaining an additional magnetic flux, in said core to compensate for dissipating losses in said magnetic field generating means comprising second and third switches connected in series between a positive voltage and a negative voltage, and a second coil mounted on the same core as the first coil and connected between earth and a common point between said second and third switches, the opening and closing of the second and third switches being controlled by second and third fixed-duration pulses respectively, and means for generating the second fixed-duration pulse based on the trailing edge of the information signal to be recorded and the third fixed-duration pulse based on the leading edge of the information signal to be recorded.

2. An apparatus according to claim 1, wherein the first pulse has a duration T, where $T = \pi \sqrt{LC}$ and where L represents the inductance of the coil and C the capacitance.

3. An apparatus according to claim 1, wherein the control circuit comprises a monostable having two inputs receiving the information signal to be recorded at its two inputs.

4. An apparatus according to claim 1, wherein the first switch is constituted by at least one MOS power transistor receiving the first pulse of fixed duration at its gate.

5. An apparatus according to claim 4, wherein the second and third switches comprise two MOS transistors mounted head to tail, receiving the second and third fixed-duration pulses on their respective gates.

6. An apparatus according to claim 1, wherein the second and third pulses of fixed duration have the same duration as the first pulse of fixed duration.

7. An apparatus according to claim 1, wherein said triggering and sustaining circuit comprises monostable means for generating the second and third pulses of fixed duration.

* * * * *